Figure 1:
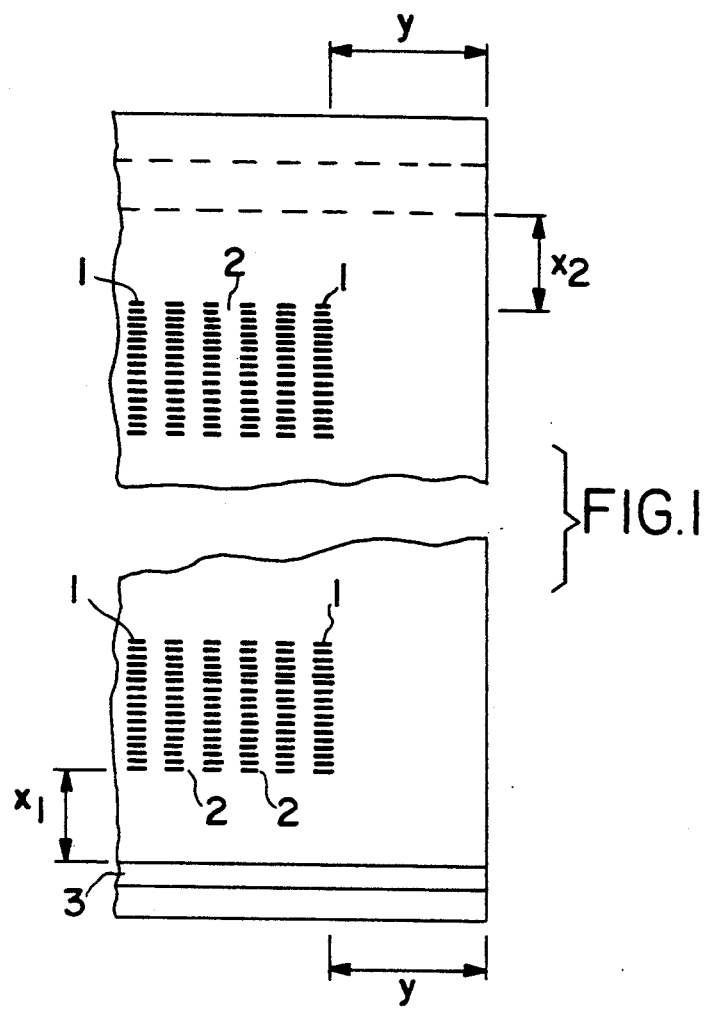

United States Patent [19]

Rasmussen

[11] Patent Number: 5,205,650
[45] Date of Patent: Apr. 27, 1993

[54] TUBULAR BAG WITH SHOCK ABSORBER BAND TUBE FOR MAKING SUCH BAG, AND METHOD FOR ITS PRODUCTION

[76] Inventor: Ole-Bendt Rasmussen, 23, Forchwaldstrasse, CH 6318 Walchwil, Switzerland

[21] Appl. No.: 435,471
[22] PCT Filed: Apr. 17, 1989
[86] PCT No.: PCT/GB89/00394
 § 371 Date: Dec. 13, 1989
 § 102(e) Date: Dec. 13, 1989
[87] PCT Pub. No.: WO89/10312
 PCT Pub. Date: Nov. 2, 1989

[30] Foreign Application Priority Data
Apr. 18, 1988 [GB] United Kingdom ............... 8809077.4

[51] Int. Cl.⁵ ..................... B65D 33/00; B65D 30/10
[52] U.S. Cl. ..................... 383/107; 383/120; 383/903; 428/156; 428/167; 493/227; 493/240
[58] Field of Search ............. 383/107, 120, 903; 206/521; 493/58, 227, 240, 241; 428/35.2, 35.5, 156, 167

[56] References Cited

U.S. PATENT DOCUMENTS

| | | | |
|---|---|---|---|
| 2,083,352 | 6/1937 | Smithe | 493/240 |
| 2,723,936 | 11/1955 | Ryan | 383/107 |
| 3,018,015 | 1/1962 | Agriss et al. | 206/521 |
| 3,232,516 | 2/1966 | Arslanian | 206/521 |
| 3,605,374 | 9/1971 | Mueller et al. | 229/2.5 R |
| 3,743,172 | 7/1973 | Ackley et al. | 428/35.2 |
| 3,832,267 | 8/1974 | Liu | 428/167 |
| 3,911,187 | 10/1975 | Raley | 428/156 |
| 4,000,352 | 12/1976 | Hollenbeck et al. | 428/156 |
| 4,076,121 | 2/1978 | Clayton et al. | 428/167 |
| 4,343,848 | 8/1982 | Leonard, Jr. | 428/156 |
| 4,401,427 | 8/1983 | Benoit et al. | 493/241 |
| 4,465,729 | 8/1984 | Cancio et al. | 428/167 |
| 4,563,374 | 1/1986 | Treber et al. | 428/167 |
| 4,566,252 | 1/1986 | Watanabe et al. | 383/37 |
| 4,946,430 | 8/1990 | Kohmann | 428/58 |

FOREIGN PATENT DOCUMENTS 1526724 9/1978 United Kingdom ............... 428/35.2

Primary Examiner—Gary E. Elkins
Attorney, Agent, or Firm—William J. Daniel

[57] ABSTRACT

Orientable thermoplastic polymeric film material is provided with at least one stretched zone in which the material has been stretched in a first direction and, adjacent to the opposite sides of the zone, unstretched zones in which the material is substantially unstretched. The material is of particular value for preventing rupture of bags containing the material, especially when the zones are adjacent a seam in a filled sack and/or in the gusset of a gusset bag.

29 Claims, 4 Drawing Sheets

TUBULAR BAG WITH SHOCK ABSORBER BAND TUBE FOR MAKING SUCH BAG, AND METHOD FOR ITS PRODUCTION

When forming bags and other articles from orientable thermoplastic polymeric film material, various ways are known and used for ensuring that the film material has adequate strength for the purposes to which the bag will be subjected. Despite this, there is always a risk that the final article will rupture during use when it is subjected to sudden forces. For instance a sack that has been filled with powder or granules may rupture when dropped. The tendency is greater with relatively rigid polymers (considering the modulus of elasticity) such as polypropylene or high density polyethylene than with less rigid polymers such as low density polyethylene, but even the low rigidity polymers have a tendency to rupture when subjected to impact.

It would be desirable to find a way of reducing the tendency for the film material (or article formed from it) to rupture under impact, and to increase the energy absorption properties of the article.

The present invention is concerned with ways of spreading the tension and other forces in a film material in such a way as to minimise the risk of rupture.

In some instances, it would be desirable for a major proportion of the article, or even the entire article, to be modified in this manner. For instance it can be desirable to modify strapping formed from orientable film material, especially strapping for parachutes, in order to minimise the risk of rupture under impact or to reduce the impact on the load which the strapping is intended to carry, or for similar reasons it can be desirable to modify the entire surface area (or parts of the entire surface area) of large sheets, such as the hood of a parachute.

In other cases it is desirable to modify minor proportions of the film in selected areas. Thus particular problems arise with sacks or bags since generally there is a particular zone in the bag at which the bag is liable to start rupturing, and I refer to this as the rupture zone. It would be particularly desirable to modify the bag in the rupture zone. Once rupturing has been initiated, the rupturing is liable to be propogated out of the rupture zone. The rupture zone, for any particular construction of bag, can be postulated from theoretical considerations or, in a more practical aspect, can be determined experimentally by dropping some full bags.

The rupture zone is often associated with a seam in the bag in that the film material adjacent to a seam is often more liable to rupture than film material elsewhere in the bag. It appears that the act of forming the seam can adversely affect the properties of the film material in the areas adjacent to the seam. However it should be noted that the rupture zone may not extend across the entire length of the seam since in a conventional bag the rupture zone may be located primarily in the area mid-way between the ends of the seam.

When the bag is a gussetted bag that has an end seal and that comprises opposed outer faces or panels interconnected at their side edges by side gussets, there tends to be a particular rupture zone at the junction between the side gussets and the seam.

A bag may have more than one rupture zone. For instance if the bag is seamed at top and bottom then there will generally be a rupture zone associated with each seam (and at which rupture is likely during edge drops) and if the bag has side gussets then there will generally be a particular rupture zone also at the junction between the side gussets and the seam (and at which rupture is likely during flat drops).

It is of course very well known to subject the film material from which the bag is made to various orientation and other treatment steps so as to impart optimum properties to it but conventionally the film throughout the entire bag is of substantially uniform properties. It is also well known to emboss the surface of the film either for visual appearances or to facilitate stacking of the film. However conventional overall embossing techniques do not give the improvements that would be desirable.

Orientable thermoplastic polymeric film material according to the invention has at least one stretched zone in which the material has been stretched in a first direction and adjacent to opposite sides of this or each zone, unstretched zones that extend substantially in the said first direction and in which the material is substantially unstretched.

Thus in the invention the film material is not of uniform stretch but is instead given variable degrees of stretch so as to provide the at least one stretched zone and the plurality of substantially unstretched zones. These unstretched zones have a degree of stretch significantly less than the stretch of the stretched zone, but they may be stretched slightly more than the original film material, before the stretching in the stretched zone. Preferably there are a plurality of these unstretched zones, each located between a pair of stretched zones.

Generally the degree of stretch in stretched zone is at least 10% and generally at least 20%, for instance up to 30 or 40% or more relative to the initial film material and preferably the film material in the substantially unstretched zones has little or no stretch relative to the initial film material. The initial film material must be orientable, but it may already have been oriented to a limited extent.

It is therefore necessary that, within each stretched zone, the film material should have a longer length than the adjacent unstretched zone. The film material in the stretched zone may comprise a series of regularly or irregularly arranged pleats that extend transversely to the length of the stretched zone. A convenient way of forming each stretched zone comprises providing a series of transversely extending positions at which the film material is stretched (i.e. it is stretched in the said first direction of the stretched zone). In particular, this is best achieved by stretching each zone by embossing the film material in that zone with teeth that extend transversely to the said direction. Often the stretched zones are longitudinal and extend in the first direction.

The invention can be applied to the entire area of a sheet material in which event, as indicated, there are preferably a plurality of the stretched and unstretched zones alternating with one another. Each unstretched zone may be in the form of a ribbon that may be rectilinear or zig-zag and which may have a width typically of 5 to 150% of the width of each stretched zone. Typically each unstretched zone is at least 0.5 mm wide and each stretched zone is at least 2 mm and preferably at least 5 mm wide. When the unstretched zones are alternating with the stretched zones, the unstretched zones are generally not more than about 5 mm or sometimes 10 mm wide although they can be wider, whilst the stretched zones can frequently be up to 20 mm or 30 mm wide, or more.

The invention is of particular value when applied to the avoidance of rupture of bags (that may be sacks).

In this aspect of the invention, tubular orientable thermoplastic polymeric film material that is or can be sealed to form a closed bag having a rupture zone at which rupture is liable to occur when the bag is subjected to rupture forces by being dropped when full is provided and the film material adjacent the rupture zone includes a shock absorbing zone comprising at least one stretched zone that extends in a direction leading substantially away from the rupture zone and in which the film material has been stretched substantially in that direction, and a plurality of substantially unstretched zones adjacent to and extending in substantially the same direction as the or each stretched zone, whereby the rupture forces are transmitted away from the rupture zone by the unstretched zones and into the stretched zone or zones.

The tubular material of the invention may be a closed bag, an open bag or an open tube that can be sealed to form an open bag. For instance it may be an endless tube that can be sealed and cut to form a plurality of tubes. The material is generally extended in tubular form, but if desired a sheet may be side sealed to form the tubular material.

In this aspect of the invention the rupture zone is preferably along a heat sealed or stitched seam in the final bag, and the shock absorbing zone is preferably a shock absorber band ("SAB") that is separated from the seam by an unstretched area through which the rupture forces can be transmitted into the shock absorbes band, and the band comprises a plurality of ribbons of substantially unstretched material extending substantially in the direction of forces acting on the seam (which normally will be substantially perpendicular to the seam) separated by strips of film material that have been stretched substantially in the same direction (i.e. normally substantially perpendicular to the seam). The width of each unstretched ribbon does, for optimum properties, depend upon the particular film materials being used but is typically in the range 5 to 150% of the width of each adjacent stretched strip. As mentioned, the direction of forces acting on the seam is normally substantially perpendicular to the seam. An exception to this are seams made on the bias in gussets.

Each unstretched ribbon preferably extends continuously across the entire depth, i.e. the dimension of the band perpendicular to the associated seam, of the shock absorber band. It may extend as a substantially straight line or as a zig-zag line provided the changes of direction within the zig-zag line are not so great as to prevent the transference of the load forces along the length of the line.

When the rupture zone is the seam, it is desirable for the shock absorber band to be displaced a short distance, for instance at least 1 cm and often at least 3 cm from the seam, in order that the rupture forces at or adjacent the seam can be distributed over a useful width of the shock absorbing band. Generally, good results are obtained when the displacement is for instance not more than 10 cm and often not more than 5 or 6 cm. The depth of the shock absorbing band, i.e., the distance from its edge adjacent the seam to its furthermost edge, is typically in the range 3 to 10 cm.

The parts of the seam where the rupture forces are most liable to cause rupture are those that are inwardly displaced from the side edges of the bag, in conventional bag designs, and so it can be unnecessary for the shock absorbing band to extend to the outermost edges. Instead it may extend between side positions that are displaced inwardly from the edges of the bag.

In a second aspect of the invention, the orientable film material is in the form of a bag comprising opposed outer faces interconnected at their side edges by side gussets. In this case there is a particular rupture zone at the junction between the side gussets and a heat sealed or stitched end seam tending to cause rupture when the bag is dropped on one of its flat faces. Part or all of the side gussets may be in the form of one or more of the described stretched zones of logitudinally stretched material whilst the unstretched zones of substantially unstretched material may be within the gussets, for instance alternating with stretched zones or at the centre fold of the gussets, or may be at the extreme edges of the gussets or at the edges of the outer faces of the sack, or may be displaced inwardly from the outer edges of the sack. This construction means that load is taken by the unstretched longitudinal zones in or adjacent to the gussets but the stretched longitudinal zones in the gussets absorb shock and so protect the junctions from rupture.

I now discuss in more detail the avoidance of rupture along a seam. The impact strength of a seam in a bag usually is one of the most critical properties of the bag. "Impact strength" here refers to drop tests performed on the bag filled with the powder or granules for which it is intended. Normally it will not be possible to produce an adequate, simple "peel-type" heat seal (as opposed to the more complicated "shear-type" heat seals) in bags made from relatively rigid polymers (referring to the modulus of elasticity) such as polypropylene or high density polyethylene, even when the mentioned two polymers have been modified by addition of elastomers in amounts economically and practically acceptable.

The peel strength of such heat seals, measured at the low velocities which are customary for tensile testing, normally will show values at generally the same level or even higher than a heat seal of low density polyethylene of similar thickness, while the impact strength of the polypropylene or high density polyethylene seals is very inferior compared to low density polyethylene seals.

By a study of these problems, I have found that the poor impact strength is connected with a phenomenon that may be equivalent to notch effect, namely, the concentration of peeling forces in a narrow linear area around the boundary of the contact-face of the seal. Additionally, there will often be a real notch effect due to imperfection in the shape of the heater bars used for forming a heat seal. Where the tensile forces are concentrated, orientation will start. If the peeling action is slow this orientation will gradually develop away from the starting line and will improve the strength in this area. If, however, the rate of the peeling action exceeds a certain critical range, dependent on the material and of parameters of the previous heat seal operation, the progress of the orientation (which is a time dependent process) will remain confined to a very limited linear zone instead of gradually widening this zone. The high energy action on an extremely limited zone almost instantly causes a rupture.

I believe the different character of the orientation process when effected below and above the critical range of peeling rates mainly is a matter of heat developed by the stretching, the heat produced by the internal friction being high when the polymer is rigid. At rates below the critical range I believe there is time for the heat to be conducted into adjacent portions of the film so as to help the orientation to develop gradually and smoothly. Contrarywise, at rates above the critical range there is not time enough for the heat to be conducted away from the narrow zone which is under the influence of "notch effect" (or similar) and the polymer will almost instantly melt within this zone.

Perforations caused by the stitching in a stitched seal may also cause weaknesses and in this case the resistance to rupture is very dependent on the velocity.

In the invention I attempt to alter the characteristics of the bag material in a region near to the seam with the aim that the energy released by dropping the filled bag should be guided to attack another, predetermined and less sensitive part of the bag construction.

It should be noted that the described deficiency in heat sealed bags from rigid materials is particularly pronounced if the material is oriented by stretching below its melting point. In this connection it is known that cross laminates of uniaxially oriented high density polyethylene or polypropylene (which may contain minor amounts of elastomer) with a suitable, not too strong bonding established between the plies, exhibit high tear propagation and impact strength values in the film itself, and glued bags (mainly valve bags) of such cross laminates have found important commercial uses. It is noted that rigidity, per se, is a desirable property for a bag material. It is also known that heat seals in these cross laminates show good peel strength when measured at the range normally used in tensile testing, however, the impact-peel-strength of such seals is particularly low, making these otherwise very useful materials completely useless for simple welded bag constructions.

By studies and theoretical work with oriented film material, I have found that the above mentioned notch effect (or similar) is adversely complemented by the loss of orientation in the area immediately adjacent to the heat sealed area. (The orientation, of course, is also lost in the sealed area itself, but since this area is thicker this seems to be immaterial in this connection.) In the oriented material itself there is a high resistance against further orientation developing, but not so in the unoriented lineary zone adjacent to the seal. Therefore, not only the notch effect (or the like) but also the ruining of orientation causes the impact action or rupture forces to be confined to a very narrow zone. As a result, even material much less rigid than high density polyethylene or polypropylene, but in oriented state, becomes useless for the sealed bag constructions here dealt with.

U.S. Pat. No. 4,039,364 concerns a method of producing a cross laminate of a type different from the cross laminates mentioned above. Here each ply is biaxially oriented, and instead of criss-crossing of directions of uniaxial orientation there is established a criss crossing of "grain of polymer", which grain is primarily produced during the extrusion, but then through the sequence of stretching steps, deflected to a desirable zig-zag course. As stated in the mentioned patent, these cross laminates generally are well suited for heat sealing, a matter which can be explained partly by the shrinkability by which the heat sealed and the adjacent areas increase in thickness, and partly by the special zig-zagging grain of polymer. Nevertheless, improvement of the heat seals of such cross laminates are still desirable, as the examples of the present specification will show.

Further, as to the adverse role of material rigidity in connection with the impact strength of a seal, it should be borne in mind that what matters here is the rigidity at the temperatures existing when the filled bag is dropped, by intent or accident. Thus, even normal low density polyethylene is relatively rigid, e.g., at −20° C., and the drop strength of simple heat seals of low density polyethylene bags at that temperatures has been found significantly inferior to that establixhed at room temperatures. However, −20° C. and even lower temperatures in many cases are normal for handling of bags and, therefore, there also exists a need to reinforce the seals of low density polyethylene bags.

A preferred bag (or tubular material for forming a bag) according to the invention comprises, in combination with a seam, a stripe pattern of embossment along the seam adjacent but spaced from the seam. The embossed pattern consists of rows of teeth-like indentations, in which the film is elongated mainly in the direction of the forces occurring during a critical type of drop, i.e. normally mainly perpendicularly to the seam, separated by ribbons of substantially unaltered film material, to cause a shock absorbing effect which protects the seam itself, when the filled bag is dropped. The embossment causes stretching.

The ribbons of substantially unaltered film material should be sufficiently narrow (compared to the teeth-like indentations), and the degree of local elongation produced by the embossment should be sufficiently high, to secure that the described shock absorbing effect really is established and acts to retard the peeling action, so that a certain orientation can "calmly" develop in the area just adjacent to the seam. The optimum design of the pattern (which will hereafter be called "the shock absorber band") depends on the performance requirements, the film characteristics, the dimensions of the bag, the material which will be filled into the bag, the degree of filling, the sealing or sewing process and the temperature at which the drops are envisaged to take place. In any case, however, this design will cause no principal problems for a skilled person working by trial and error.

Figure 2A:
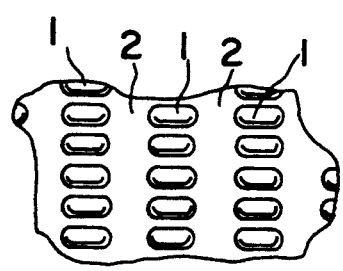
Figure 2B:
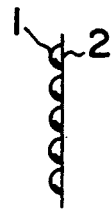
Figure 3:
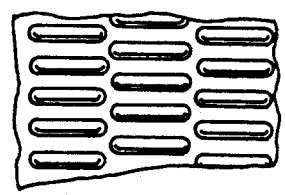

The ribbons of unaltered film material may be generally straightline ribbons (reference to FIGS. 1 and 2a) or may be generally zig-zagging as by staggered embossment (reference to FIG. 3). The former makes the machining of embossment tools easier, while the latter enables the most efficient shock absorption effect, which may be needed when the material is particularly rigid or particularly oriented.

In the description above, the invention has been described with a particular view to "peel-type" heat seals. However, a similar problem of low impact strength often exists for "overlap" seals in cases when heat sealing of the material is difficult, in particular when the polymer is oriented. Problems of a similar nature can also occur with overlapping seams bonded by a melt adhesive and with supersonically produced seams. The invention therefore is useful in all such cases.

Further, the invention is very advantageous in connection with a sewn seam. The strength of a sewn seam is essentially dependent on the tear propagation strength in the film, which again for stiff and/or oriented material is critically dependent on the velocity of tearing. This also is true for the above mentioned two kinds of cross laminates, which both show a high tear propagation strength up to a certain critical range of tearing rate, but generally poor tear propagation strength above this range. The "shock absorber band" therefore can advantageously be used to take up the top of the impact action, reducing the tearing rate to a value below the critical range.

The shock absorber band is applicable to top and bottom seams as well as side seams. It has been found that the forces exerted near the corners of a filled bag when the bag is dropped are always relatively small, consequently the "shock absorber band" needs not extend right to the edges of the bag.

The invention further concerns the method of combining seaming of a bag with embossment in the specific pattern which appears from the above description of the product, and to the combination of seaming and embossing apparatus for carrying out this method.

The shock absorber band can be produced prior to, simultaneous with or subsequent to the seaming process. Thus, the shock absorber band can be embossed either (a) on film before tubing, or (b) on tube before bag making, or (c) on the bag before filling, or (d) on the filled bag before the final seam is made, or (e) after making the final seam. The invention also covers bags and pre-stages of a bag (e.g., tubes for form-and-fill) with shock absorber band alone, correctly located in relation to a seam which is not yet made but intended to be made later. This will usually be the top seam or both top and bottom seams made in connection with the filling process. Bag machines or form-and-fill machines using preformed tube with shock absorber band can be supplied with synchronisation devices so as to make the seams at the correct locations in relation to the bands.

As mentioned, a shock absorber band for the top seam of an open mouth bag can be made after the filling process, in connection with seaming of the bags. The seaming will usually take place by a conventional band sealer or a conventional sewing machine, and in such cases the shock absorber band is preferably produced continuously between a set of embossment wheels of which one can be supplied with a male surface pattern and the other with a corresponding female surface pattern. (See FIG. 5a and b.) In other cases it will often be preferable to carry out the embossment intermittently, e.g., by use of a hydraulic or pneumatic press, still between male and female formed surface patterns.

If a transverse shock absorber band is made by embossment of tubular film, it may be difficult, without special measures, to open the tube for filling. Therefore, it is often advantageous to make at least the shock absorber band for the top seam of an open mouth bag while the bag material is a flat film, and then convert the flat film to a tube. In such cases, the machinery for embossment can conveniently be combined and synchronised either with a printing machine or directly with the bag making machine.

In this case the side seam is formed subsequent to the embossing of the shock absorber band for bottom and/or top seams and when the side seam is produced either by application of hot melt adhesive or by heat sealing, the application of heat will cause the embossment to disappear at the spot where the shock absorber band intersects with the side seam. However, this does not have any adverse effect provided the side seam is located very close to one edge of the bag since as mentioned above the impact action is relatively low near to the corners of the bag.

The fact that only the unaltered ribbons in the shock-absorber-band have to carry the tensions perpendicularly to the seam, means that the coefficient of elasticity in this band appears to be significantly reduced, so that the band so to say acts as a rubber band, and at the same time the all-over yield force in the band will be reduced. Both features will be further explained in connection with FIGS. 1 to 4. The reduction of yield force can lead to permanent deformations of the material within the shock-absorber-band even during normal handling or storage of the bag, but these deformations normally will be relatively unimportant, since they are confined to the narrow band and, generally speaking, terminate when the bosses have become straightened out. The balance between the needs for good drop performance and sufficient resistance to yield is an important factor to consider in the choice of optimum pattern.

If the bag is intended to be carried manually and maintain its shape after this, the shock-absorber-band should preferably not traverse the bag surface from edge to edge, but portions near the edges should be left unembossed, these being of a width sufficient to avoid any substantial deformation when the filled bag is lifted at the corners. As mentioned earlier, there is no essential need for shock-absorption effect at these locations, since in any case the peel forces will be relatively low here when the bag is dropped.

In order to achieve a sufficiently important shock-absorbing effect, the pattern and depth of embossment should be adapted to give no less than 15% and preferably more than 25% improvement of "critical drop height" for one drop cycle. "Critical drop height" here is defined as the drop height which, statistically, is the limit between no-failure and failure, when one bag with the relevant contents of powdered or granulated goods is dropped 6 times in the following cycle: (1) 1st flat surface, (2) 2nd flat surface, (3) 1st edge, (4) 2nd edge, (5) bottom, (6) top.

However, with suitable selection of pattern and depth of embossment (guidelines for this selection given in connection with FIGS. 1 to 4) the increase in critical drop height for one drop cycle can in many cases be 50% or 100% or even more, without causing any essential damage of the capability to resist deformation during handling and storage of the bag. Embossment of the film material in bags is known for the purpose of improving the anti-slip characteristics, which are important for stacking. For this purpose, however, it is important to select a type of embossment which only creates minimum reduction in coefficient of elasticity and yield force (referring to the apparent values as further explained in connection with FIGS. 1 to 5). A bag with the shock-absorber-band can also, in order to improve the anti-slip properties, be supplied with an additional embossment in other selected areas or generally all-over, but in such cases the pattern and depth of embossment in the shock-absorber-band must be adapted to produce a substantially higher shock absorption effect. (The basic features of shock absorption effect are explained more quantitatively in connection with the graphs in FIGS. 4A and 4B.)

As mentioned in the introduction, gussetted sacks with button and/or top heat seals have a particular, spot-formed rupture zone in or immediately adjacent to each of the intersections between the innermost folds of the gussets and the bottom or top heat seal. The rupture in these zones mainly occurs when the filled sack is dropped on one of its flat faces. There are two reasons for the tendency to rupture in these spots, one which one is the sudden change in thickness between the gussetted, 4-ply, part of the sack and the part which is not gussetted, i.e. is 2-ply. This change of thickness makes the heat-sealing particularly critical. Another reason why rupture tends to occur in these spots is that, when the sack has been filled and the gusset therefore has unfolded to give the sack brick-form, the pull on the gusset at each corner of the sack has to be taken-up mainly by the narrow spot where the heat-seal intersects with the innermost fold of the gusset. Then when the sack is dropped on one of its flat faces, the contents becomes thrown out against the corner of the sack, and the resultant pull on the gusset in this corner concentrates in the narrow spot of intersection. Consequently, gussetted sacks cannot withstand flat drops from the same maximum heights as simple "pillow sacks" of similar material, unless special precautions are taken. This applies also to gussetted sacks from soft and readily heat-sealable materials such as LLDPE or LDPE.

In the known art, this problem is solved by supplying each gussetted corner with two extra, rectilinear heat-seals, each one sealing one side of the gusset to the corresponding outer ply of the sack, and each starting in the mentioned spot of intersection and extending on bias, normally inclined 45° to the longitudinal direction of the sack. With these extra heat-seals, the gusset will still unfold in the normal way in the corner and will give the sack brick-shape during filling, but now the forces on the gusset in the corner during a flat drop will become distributed over the entire length of the two extra heat-seals instead of concentrating on one spot.

A drawback of this commonly used precaution is the relatively long time needed for the special extra heat-sealing, which necessarily includes a cooling step before the two sides of the gusset meet each other again, since otherwise they would fuse together and form one single seal.

Therefore, the extra sealing procedure is more conveniently, according to this invention, replaced by application of S-A-B to the gussets in the corners of the sack. This S-A-B should not, in essence, extend into the two outer plies of the sack, but be confined to the gusset near the corner (here referring to the structure of the sack before unfolding of the gusset).

Ideally, the unstretched zones or "ribbons" in the S-A-B should all point in the direction of the spot of intersection so as to point the same way as the tensions in the unfolded gusset but in order to make the construction of the tools simpler the pattern of embossment can be like in example 3, in which the ribbons" all extend in the logitudinal direction of the sack. At least the "ribbons" near the innermost fold of the gusset then mainly point towards the spot of intersection.

As an additional advantage, the apparent strong reduction of coefficient of elasticity effected by the embossment of the gussets near the corners of the sack helps the contents better to fill out the space in the corners and thereby the brick-shape becomes perfected.

Shock-absorber bands can optionally be used in combination with the embossment of the gusset here described. Thus, the combined use of "gusset embossment" and "shock-absorber-band" described in example 3 gave improvement in critical drop height by a factor exceeding three. The "gusset embossment" is preferably carried out on flat film before tubing or on flat tube before gussetting, but can also be carried out after gussetting, and even after bag-making, provided the internal of the bag is conveniently accessible.

An alternative, and in some cases simpler precaution, which does not truly fall under the above mentioned definition of shock-absorber-band but utilises an analogous effect consists in stretching by embossment the innermost fold of the gusset immediately adjacent to the bottom and/or top seals. Thus the gusset and the adjacent faces of the bag can be considered to be a special form of the shock absorbing zone of the invention, which may extend from a position at or close to the junction between the seam and the side gussets and which need not extend substantially across the width of the gussets. The edge of the outer faces of the bag and/or parts within the gusset may serve as the substantially unstretched zones adjacent to the stretched zone, that is part or all of the area within the gussets. Simultaneous embodiment of the outer plies of the sack may do no harm, but makes the procedure simpler. This embossment in the gussets must be sufficiently deep and/or sufficiently close to the seal, to produce the effect that a tension applied to the fold is essentially carried away from the spot of intersection (where the heat-sealing as mentioned tends to be critical) and into a part of the heat-seal closer to the edge-face of the sack.

Preferably, this embossment should gradually fade-off in the direction towards the edge in such a manner as to distribute the forces up on the innermost fold of the gusset over a wider part of the bottom or top seal.

In order to ensure a precise location of this embossment relative to the spot of intersection between the innermost fold and the bottom or top seal, this embossment is more conveniently carried out simultaneously with the heat-sealing on the same apparatus, which may comprise means to detect the transverse location of the innermost fold and accordingly for automatic transverse adjustment or the location of embossment.

As already mentioned, the shock-absorber-band is very suited for bags made from the cross-laminates described in U.S. Pat. No. 4,039,364. The same is true for the "gusset embossment" described above. U.S. Pat. No. 4,629,525 discloses improved compositions for cross-laminates of this type, consisting of two or more plies, of which each normally has a main layer, a layer to facilitate lamination, and a seal layer. The two embossment systems according to the present invention can advantageously be used, separately or in combination, on bags from these compositions. Thus, a particularly preferred main layer for use in such laminated sheet for the bag of the invention is formed of a blend of high molecular weight high density polyethylene with significantly lower molecular weight low density polyethylene, the latter preferably being selected from copolymers and/or branched polyethylenes which have the same or higher elongation of break (tested at room temperature under slow stretching) as the high molecular weight polyethylene and which are capable of distinctly segregating, while forming a distinct microphase, from the high molecular weight polyethylene on cooling of a molten homogeneous blend of the components. The blending ratio of the polyethylenes is preferably 25:75 to 75:25. The inclusion of polypropylene having significantly lower molecular weight than the high molecular weight polyethylene can also be advantageous, in amounts from 0 to 70%, based on the combined weight of polypropylene and both polyethylenes.

The high molecular weight high density polyethylene (HMHDPE) preferably has a melt flow index of about 0.2 or lower by ASTM D1238 condition E, and the low density polyethylene is preferably linear low density polyethylene (LLDPE).

In the accompanying drawings:

FIG. 1 shows, on scale about 1:3, an open-mouth pillow-bag, supplied with two shock-absorber-bands, one near the heat-seal at the bottom, and one at the top near the region predetermined for closing either by heat-sealing or by sewing.

FIGS. 2A and B are details on about true scale of the bottom of the sack of FIG. 1, A being a horizontal view of the bag, and B a longitudinal, vertical section passing through a row of indentations.

FIG. 3 is a modification of the shock-absorber-band of FIG. 2A, also shown in horizontal view and on about true scale.

FIGS. 4A-1, 4A-2, 4A-3, and 4A-4 are strain/stress diagrams taken on 4 specimens from the shock-absorber-band zone of a sack produced as described in Example 4.

FIGS. 4B-1, 4B-2, 4B-3, and 4B-4 are strain/stress diagrams for comparison, taken on 4 specimens from the same sack, but outside the "shock-absorber-band" zone. In each of the two sets of stress-strain diagrams, where each unit along the abscissa measures one centimeter, one centimeter represents a 20% change in the specified property.

Figure 5A:
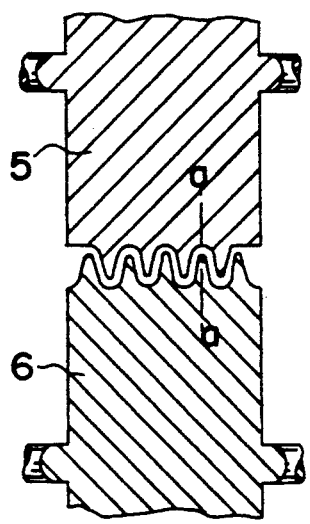
Figure 5B:
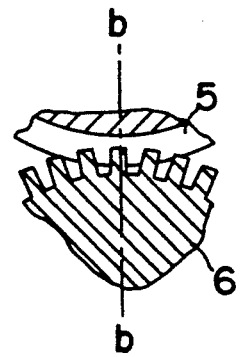

FIGS. 5A and B show different sections of a set of embossment wheels (rollers) suitable for making the shock-absorber-band. FIG. 5A is a section through b—b of FIG. 5B, and FIG. 5B is a section through a—a of FIG. 5A.

Figure 6:
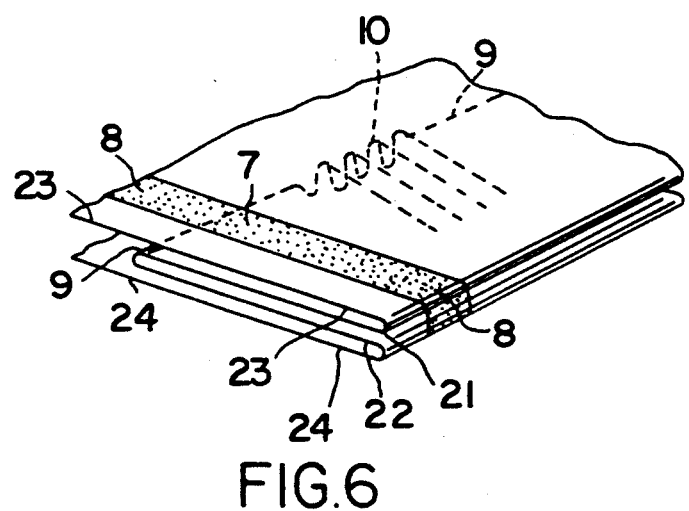

FIG. 6 is a perspective view on approximately true scale showing a corner of a gussetted bag, in which the gusset is supplied with an embossment to eliminate the critical tension which otherwise occurs at the intersection between the seam and the innermost fold of the gusset.

Figures 1, 4A:
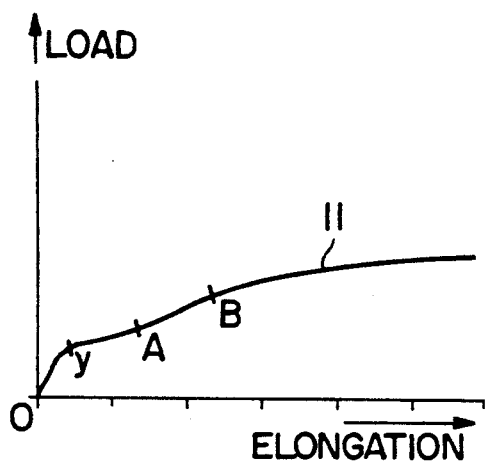
Figures 2, 4A:
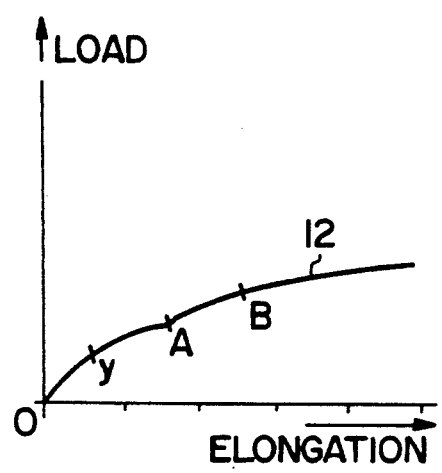
Figures 3, 4A:
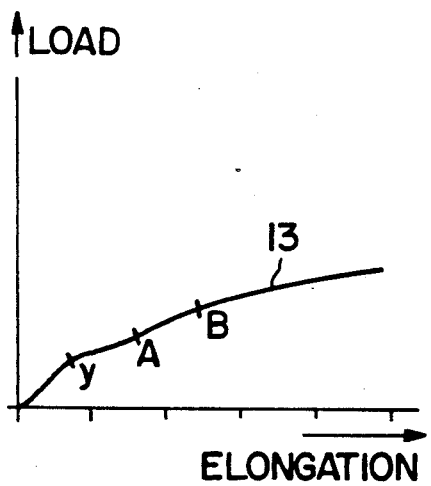
Figures 4, 4A:
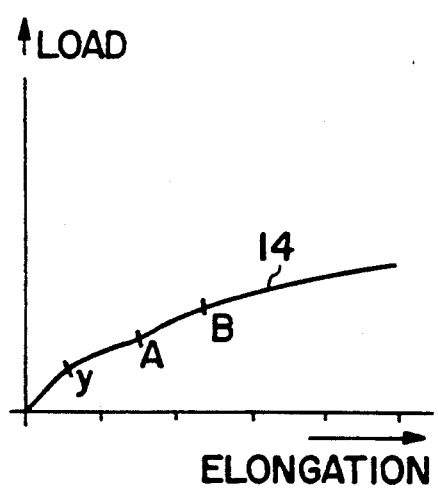

In FIGS. 1 through 3, (1) are rows of teeth-like indentations and (2) unaltered (or substantially unaltered) ribbons, (1) and (2) together forming the shock-absorber-band (hereinafter abbreviated to S-A-B). (3) is the heat-seal at the bottom. At the top, (4) indicates the zone where the bag is predetermined to become closed either by heat-sealing or by sewing. There are relatively long distances $X_1$ and $X_2$ from the S-A-B's to (3) and (4) respectively, the lengths of which will be discussed below.

At each corner of the bag, a zone Y is preferably kept free of embossment. Y should be calculated so that it is sufficient to avoid any essential deformation when the filled bag is carried by the corners in the way by which it is intended to be handled.

Edge-drop is by far the most critical kind of dropping for top-and bottom heat-seals or sewn seams in pillow bags. (For gussetted bags flat drop is more critical due to the special problem dealt with in connection with FIG. 6, and for longitudinal seams bottom-drop and top-drop are most critical). When the edge of the bag filled with powder or granules hits the ground, the contents are with great force spread horizontally. At the moment the bag hits the ground, the spreading is confined to take place almost entirely perpendicularly to the length of the bag, and near top and bottom the impact on the flat surfaces of the bag then will cause a high longitudinal pull, that means strong peeling action on top and bottom seams. I have found that this peeling action is highest near the middle of the seams, or somewhat closer to the edge which hits the ground. It is very understandable that the peeling is near zero at the corners which do not hit the ground, but rather surprising that it also is low near the corners which do hit the ground.

The improvements achieved by use of the S-A-B are best understood by observation of the graphs in FIGS. 4A and B.

The edges of each of the specimens 11 to 14, of the invention, for the graphs in FIG. 4A have been cut through the middle line of two unaltered ribbons (2) and each specimen comprises two rows of teethlike indentations (1) with an unaltered ribbon (2) between. In total therefore, each specimen consists of two rows of teethlike indentations (1) and two unaltered ribbons (2). The specimen width is 22 mm. The initial distance between the jaws of the tensile testing apparatus is 50 mm, and the specimen has S-A-B throughout this space. (The width of the S-A-B is also 50 mm, see example 4.) The testing velocity is 500 mm/min=1000% elongation per min. In the graphs, 10 mm on the abscissa corresponds to 20% elongation.

Figures 1, 4B:
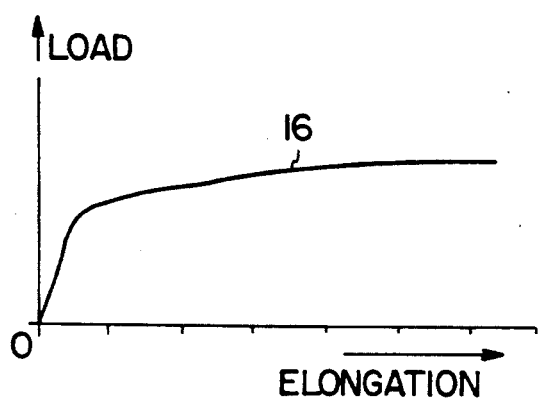
Figures 2, 4B:
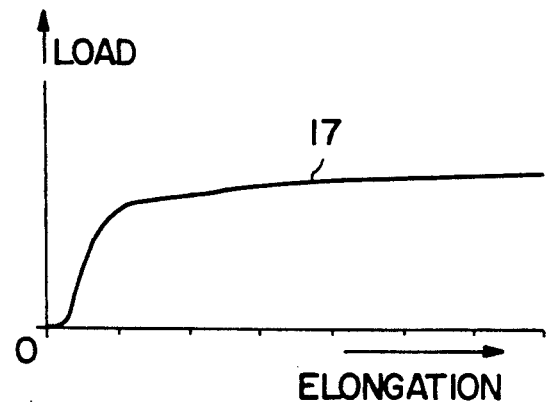
Figures 3, 4B:
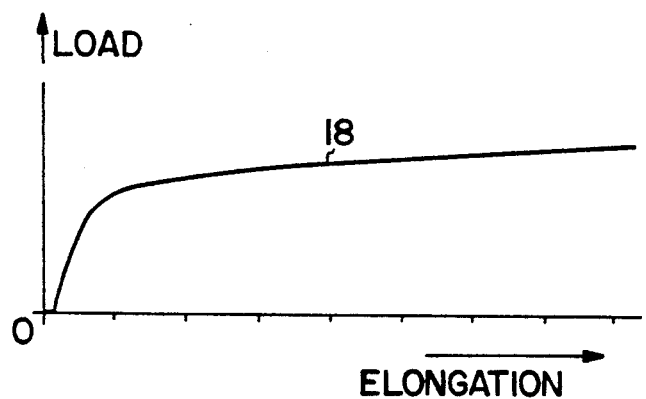
Figures 4, 4B:
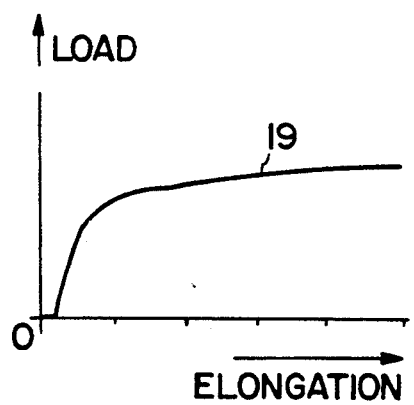

The comparative set of graphs FIG. 4B was also made from 22 mm wide specimens 16 to 19 cut from parts of the sack that are free of shock absorber band.

In the range from zero to the deflexion point Y, the ribbons become elongated in elastical manner, but begin to yield at Y. In this range, comparison between the two sets of graphs shows that the slope in curves A is almost exactly half that of the curves B, in accordance with the fact that each ribbon in the S-A-B in this actual case (see example 4) has been made with the same width as each row of indentations, so that almost exactly half the width of the specimen is under load. The slope in this range is a measure of the coefficient of elasticity—for the embossed samples it is more correct to say apparent coefficient of elasticity—and the graphs demonstrate how the S-A-B makes the material appear more rubber-like.

With the film composition used in example 4, the ratio between width of ribbon and division in the S-A-B could also have been somewhat higher than the actually used ratio 1:2 and still would have given satisfactory improvements, while it can be necessary to make the ratio much lower in case of much stiffer compositions, e.g., to make it 1:10 or even 1:20 (see example 1 in which it was necessary to use ratio 1:10).

Between deflexion point Y and the next deflexion point A, the ribbons are yielding, while the indentations still are slack. At point A, the indentations are straightened out and begin to elongate elastically, while the ribbons continue yielding. At the last deflexion point B, the former indentations also start yielding.

The elongation in percent at A is essentially equal to the original stretch ratio in the row of indentations, in this case about 28% equalling ratio 1.28:1.

One important factor for the function of the S-A-B is the apparent reduction of coefficient of elasticity and yield point, dealt with above, which invites the impact to attack the S-A-B instead of attacking the seam. Another important factor is the energy absorbed by the S-A-B from zero to deflexion point B, which I call "S-A-B energy". This must be sufficiently big to "pacify" the impact caused by the edge drop, so that, after the S-A-B having been in effect, the attack on the seam will not be strong enough to ruin the latter.

The indentations should preferably be made as deep as practically possible (i.e., the stretching ratio in the rows of indentations highest possible) so that the S-A-B energy per width of the S-A-B becomes highest possible (for any given pattern of embossment) however, there are the following practical limitations:

(a) the limited stretchability of the film, in connection with the required high process velocities, (b) the weakness of the teeth (fins) of the embossment devices.

With the types of cross-laminates which are described in the examples, and which already have been stretched in both directions before the embossment in ratios between about 1.4:1 and 1.6:1, I have found it difficult to exceed ratios 1.3:1 or 1.4:1 when making the indentations, unless preheating of the film is used in the areas which are to be embossed, and normally I would avoid preheating which is a complication of the process. Stretch ratios lower than about 1.3:1 are also applicable when making the rows of indentations, provided at least 15%, but preferably more than 25% improvement in critical drop height of the bag (as this term is defined above) can be achieved.

The optimum length of S-A-B and ratio between the width of each ribbon and the division in the S-A-B (total width of a ribbon and a row of indentations) must be established by systematical experiments or general experience, and depends, as already mentioned in the summary of the invention, on the performance requirements, the film characteristics, the dimensions of the bag, the material which will be filled into the bag, the degree of filing, the sealing or sewing process, and the temperature at which the drops are envisaged to take place. As regards performance requirements, the balance between the need for good drop performance and the need for form stability of the bag is particularly important.

In FIGS. 1 to 3, the indentations are shown oblong, with their longitudinal direction perpendicular to the longitudinal direction of the ribbons (2). This structure will normally be advantageous, but it is also possible to substitute each oblong indentation with two or more generally circular indentations; although this will require more complicated apparatus for the embossment. In some cases, when only a small S-A-B effect is aimed at, single rows of generally circular indentations can be used in alternation with the ribbons (2).

The division of the indentations in each row should preferably be as small as practically possible, the lower limit being determined by the obtainable strength of the teeth (ribs) in the apparatus for embossment and the practically obtainable accuracy of this apparatus. For bags from very thin film, this division can be down to about 1.5 mm, while suitable values for heavy-duty bags generally are between about 2.0–4.0 mm, although somewhat bigger divisions also are applicable.

It has already been mentioned that the indentations must not start immediately adjacent to the seam (i.e., the distance x=0). In that case each ribbon (2) would pull almost with its full force on a corresponding portion of the seam, and practically no improvement would be achieved.

In order to even out the forces on the seam, x should never be less, generally speaking, than about the same as the distance between two neighbour "ribbons", i.e., the width of each row of indentations, and preferably x should be a few times, e.g., 2–6 times this distance. X can also be longer, but since the tensions, when the bag hits the ground on edge, are concentrated near top and bottom, the entire S-A-B should generally be confined to a zone within a distance from the seam (or location predetermined to become seam) not exceeding 25% and preferably not exceeding 15% of the total length of the bag (or, in case the S-A-B is made for protection of the side-seam, of the width of the bag).

In FIGS. 5A and B, both wheels (5) and (6) are driven with the same circumferential velocity, and the surfaces of both are formed as circular fins and grooves, the fins on one wheel fitting into the grooves of the other, with space left between for the bag material, so that the bag, when passing between the intermeshing fins, is stretched perpendicularly to the direction of advancing. While the fins on (5) are continuously circular, the fins on (6) are formed in dent-shapes as shown. All corners and edges which get into contact with the bag are carefully rounded and ground to avoid puncturing of the material.

The bag is passed through the embossing device in a direction parallel to the top or bottom seam, whereby the top or bottom S-A-B shown in FIG. 1 is formed. Both can of course be formed simultaneously by use of two sets of embossing wheels.

At the inlet, the apparatus is preferably supplied with guide wheels (rollers) acting to keep the bag straightened out while counteracting the dragging towards the middle of the wheels (not shown).

The set of wheels is preferably made to open and close, so that embossing can be avoided near each corner.

The feeding of the bag into the device, and opening and closing of the wheels, can be done manually, semi-automatically or fully automatically. Immediately prior to the embossing and working in line with the wheels, there may be provided a pre-heating device which selectively heats the vicinity of the coming S-A-B. This can, e.g., be a device similar to a band-sealer, but operated at a temperature at which sealing does not occur. After the embossing, there may be a calendering step to reduce bulk.

The device here described is the simplest and cheapest apparatus for producing the S-A-B. Alternatively, a press can be used having similar intermeshing fins, but of course in rectilinear instead of circular arrangement. This will be the apparatus normally used, if the process is carried out before bag-making.

With reference to FIG. 6, which illustrates the gusseted bag aspect of the invention, the location (7) where the heat-seal (8) intersects the innermost fold (9) of the gusset is very critical when the bag is dropped on one of the major surfaces (flat drop). While the contents spread out horizontally, the gusset material adjacent to (9) comes under a particularly high tension, which tends to start tearing along the sealing at location (7).

I have solved this problem by stretching a portion (10) of the gusset in a direction parallel to the longitudinal direction of the bag. This stretching is carried out by embossment between mutually intermeshing fins, most practically before the gusset has been formed. It is confined to plies (21) and (22) which form the gusset, while the two outermost plies (23) and (24) are not embossed. I refer to this localised stretching as "Gusset Embossment". It eliminates or reduces the tensions at location (7) and can thereby, in case the bag material is a relatively rigid or an oriented film, increase the critical drop height by a factor of 2 or 3 or even more (see example 3).

The drawing shows the Gusset Embossment as a number of indentations, and not as a pattern like the S-A-B, where rows of indentations alternate with unaltered ribbons. However, such alternating pattern is also useful, but not mandatory, for the Gusset Embossment.

In the foregoing, the invention has been described almost entirely with a view to sack applications, where the need is to build in shock-absorbing properties into a selected area near to a seam. However, it has briefly been mentioned that there also can exist a need to modify a major proportion of or even the entire article, especially in connection with manufacture of parachutes. This applies in particular to cheap, disposable parachutes for parachuting of materials such as vehicles or containers. It is usually desirable that the unfolding of the parachute is postponed as much as possible, but the impact forces on the load and on the parachute itself when the parachute unfolds sets the limit for how late this can be.

Therefore, parachutes are often supplied with shock-absorbing devices. The present invention, however, enables particularly efficient shock-absorption by simple and cheap means. Thus, the strapping can be made from film material (preferably assembled from several layers, which may be only loosely held together) which over a suitably long length is supplied with a pattern of stretched and unstretched zones according to the invention. Alternatively, the parachute cloth can be made from polymeric material which is supplied with a pattern of stretched and unstretched zones according to the invention over an essential part of its area, which may be almost the full area.

The direction of the substantially unstretched zones in this pattern should preferably be mainly parallel to the local directions of force when the parachute unfolds and should preferably be in the form of a plurality of ribbons.

It is well known that orientable polymers, especially the highly crystaline and stiff ones such as high density polyethylene or polypropylene, exhibit high yield point and at the same time, if drawn slowly, a high elongation at break (up to about 10 times) and a high ultimate tensile strength. Therefore, the energy absorption up to the breaking point is also very high when the polymers are slowly drawn, but during very quick drawing they may rupture almost without any permanent deformation. By application of the present invention, the physical characteristics can be changed very significantly so that, even under the worst impact conditions, a permanent deformation can start at almost zero tension and progress in predetermined way under increasing resistance to a high degree of elongation and to a force close to the ultimate tensile force obtained during slow drawing.

Especially for these uses, the substantially unstretched ribbons should preferably be very narrow, and the degree of stretching in the individual boss on the film very smoothly varied from zero at the boundary of the ribbon to the maximum value near the middle of the boss between two ribbons.

Material very suited for such strapping is high density polyethylene and polypropylene, which both may be used unblended. For the parachute cloth (or hood) one can use cross-laminates of the biaxially oriented type and generally similar composition as the sack material used in examples 3 and 4. Additionally, the blends can contain polypropylene.

EXAMPLE 1

This example demonstrates the improvements achieved with shock-absorber-band on heat-sealed pillow-bags from polypropylene-based, biaxially oriented cross-laminates at 0° C. At this temperature, the heat-seal will act so fragile without a S-A-B, that such materials cannot be used for heavy duty bags with simple heat-seals.

A cross-laminate based on gas-phase-type polypropylene was produced generally as in Example 2 of my U.K. patent no. 1,526,722 and the corresponding U.S. Pat. No. 4,039,364, however with the following essential differences:

(a) 4-ply instead of 3-ply, with the angles of main direction: +45°, +30°, −30°, −45°.

(b) Gauge 90 gsm instead of 72 gsm.

(c) The admixture to the polypropylene in the middle layer of the coextruded film was 20% lineary low density polyethylene (LLDPE) instead of 14% EVA.

(d) The surface layers of the coextruded film were blends of polypropylene and ethylene-propylene-dimer rubber (EPDM) instead of EVA.

The cross-laminate was tubed by use of an extruded melt-adhesive for the side-seam, and the tube was cut into lengths of about 1.0 m. Flat width: 500 mm. The side-seam was positioned very close to the edge. The bottom seams for the open-mouth bags were produced manually by impulse-sealing. In order to allow shrinkage to take place in the heat-seal and thereby a growth of its thickness, the cooling period in the sealing process was set at zero, so that all cooling took place after release of the pressure on the jaws.

The reason for placing the side-seam very close to one edge is that I have found the intersection between heat-seal and side-seam most prone to start of tearing along the heat-seal (on edge-dropping). More correctly, the weak zone is not in the side-seam itself, but immediately adjacent to the latter, where the seal is inadequate. It was hypothetically assumed that the edge drop causes only low peel-forces near the edge which hits the ground compared to the peel forces at the middle of the seal—and of course the peel forces will be nearly zero near the other edge—so it was assumed that highest "critical drop height" is achieved with the side-seam near to one of the edges. The proof hereof is given in Example 2.

Each bag was filled with 25 kg polyethylene granules, and a piece of the top was cut off to leave about 11–12 cm free space over the evened—out level of the contents (bag standing upright, major bag faces folded over the level of the contents to the middle, free space measured hereover). The bag was closed by overtaping with reinforced adhesive tape. In practical production it should be closed either by heat-sealing or sewing, and a S-A-B provided also at the top, but it was judged that the effect of the S-A-B per se can be determined by investigations only of such heat-seals or sewn seams which are made prior to filling.

The drop-testing was carried out at ambient temperature 0° C., and the contents of the bags (the polyethylene granules) were precooled to this temperature.

In a series of initial trials, the applicable ratios between widths of "unaltered ribbons" and "rows of indentations" were determined as follows: A primitive laboratory press was made for embossment of one row only of indentations, consisting of 15 single indentations, each 10 mm long, with row division (distance between top of two neighbour indentations) being 3.0 mm. The S-A-B was made from edge to edge by repetition of embossment, row by row. The "ribbons" were kept at constant width within each bag, but different ribbon-widths were tried. The stretching ratio, corresponding to the depth of embossment, is believed to have been about 1.20:1, and in any case was the same for all embossments. The S-A-B was started 30 mm from the heat-seal.

It was found that the width of the "ribbons" had to be down at about 2 mm to give a significant improvement, and 1 mm was estimated to be the optimum.

An embossing apparatus as shown in FIGS. 5A and B was made for ribbon-width 1. mm, row-width 10. mm, row-length (=width of the S-A-B) is 50 mm, division of each row 3. mm, and 17 indentations in each row. Start of S-A-B 30 mm from the heat-seal. It extended the width of the bag.

The embossment was carried out at room temperature, with the fins or teeth of the wheels practically in full engagement (exactly the same engagement in all trials) which is believed to have corresponded to stretch ratio about 1.2:1.

The strength of the heat-seal with and without embossment was determined as the critical drop height, which statistically, is the limit between no-failure and failure, when one bag with the relevant contents is dropped 6 times in the following cycle: (1) 1st flat surface, (2) 2nd flat surface, (3) 1st edge, (4) 2nd edge, (5) bottom, (6) top.

However in order to simplify the testing work for heat-sealed pillow-bags, the determination has been modified so that only one drop is carried out per bag, namely an edge-drop on the edge closest to the side seam. The justification for this simplification is my experience (confined to the biaxially stretched type of cross-laminates) that when a bag has passed one edge-drop, the weak, disoriented line adjacent to the heat-seal will be reinforced by an orientation caused by the drop. Therefore, subsequent drops of the same bag from the same height will in any case give positive results and are needless. Further, drops (1) and (2) of the above-mentioned cycle (the flat drops) have been found, practically speaking, neither to weaken nor to reinforce the heat-seal of a pillow bag. This simplification of testing procedure is not applicable to either gussetted or sewn bags.

Table of results, indicating for each trial, drop height in cm, and passed=P or failed=F.

| Without SAB | | | With SAB | | |
|---|---|---|---|---|---|
| Bag No. | Drop Height | Result | Bag No. | Drop Height | Result |
| 1 | 160 | F | 3 | 250 | F |
| 4 | 140 | P | 15 | 240 | P |
| 5 | 140 | F | 17 | 240 | P |
| 12 | 120 | F | 16 | 240 | F |
| 13 | 120 | F | 6 | 220 | F |
| 14 | 120 | F | 7 | 200 | P |
| 18 | 100 | F | 8 | 200 | P |
| 19 | 100 | F | 9 | 200 | P |
| | | | 10 | 200 | F |
| | | | 11 | 200 | P |
| | | | 2 | 190 | P |

Since only one bag without S-A-B has passed, namely no. (4) from 140 cm, while 3 bags from 120 cm and 2 from 100 cm have failed, it is believed that no.4 was not a straight edge drop but should be discarded. The critical edge drop value therefore will be lower than 100 cm for the bag without S-A-B, while it is estimated to be about 220 cm for the bag with S-A-B.

EXAMPLE 2

The objective of this example is an elaborate drop-strength comparison at room temperature between heat-sealed bags with and without S-A-B, made from biaxially oriented cross-laminates of two different compositions, one based on polypropylene, and the other on polyethylene. In each case, drop-test comparison are also made between bags having the side-seam 15 cm from an edge, and bags with the side seam adjacent to an edge. The polypropylene-based cross-laminate was a similar 4-ply as in Example 1, except that the addition to the polypropylene in the middle layer of the coextruded film now was 10% EPDM. The gauge still was 90 gsm. The polyethylene-based cross-laminate was a combination of high-molecular-weight-high-density-polyethylene (HMHDPE) and linear low density polyethylene (LLDPE), namely the 2-ply cross-laminate designated as "$R_1$" in Example 3 of U.S. Pat. No. 4,629,525.

Tubing and bag making was carried out like in example 1. The bag width was 490 mm for the polypropylene-based bags and 560 mm for the polyethylene-based bags.

The pattern of S-A-B, its distance from the heat-seal, the embossment apparatus and the engagement between the fins of the latter were also exactly as in Example 1. The S-A-B extended the bag width. It is believed that the stretch ratio has been about 1.20:1.

The bags were filled with 50 kg of PVC granules plus sand, and the top closure was made with a self-adhesive reinforced tape like in Example 1.

Free space 11–12 cm like in Example 1.

The critical drop height was determined in the same simplified manner as in Example 1.

In the table below:
Film Type A is polypropylene 90 gsm
Film Type B is polyethyelene 70 gsm
Sack Type S is a bag without SAB and side seam 15 cm from edge
Sack Type C is a similar bag to S but with side seam at corner
Sack Type C+SAB is a similar bag to C but with one SAB
Sack Type C+2SAB is a similar bag to C but with two SAB
Edge Drop Tests recorded the height of drop and whether the sack passed P failed F, just failed (F) with a split below 10 mm or split at the SAB, probably due to puncture during the embossing (F*)

The seal is formed by a Star Impulse Sealer at the Weld Time and Heat Rating Settings quoted, except for the two series sealed with a Doboy Band Sealer.

As it appears from the table, the move of the side-seam to the edge generally lead to about 50% improvement of the critical drop height, and the use of S-A-B further lead to about 50% improvement. Use of a second S-A-B close to the first one gave no significant extra improvement.

| Film Type | Sack Type | Time Weld secs. | Heat rating | 1 | 2 | 3 | 4 | 5 | 6 | 7 | 8 | 9 | 10 | Estimated critical drop height |
|---|---|---|---|---|---|---|---|---|---|---|---|---|---|---|
| A | S | 3¼ | 4 | 150 P | 200 F | 150 F | 150 P | 180 F | 180 F | 160 F | 160 (F) | 160 F | — | 160 |
| A | S | 3¼ | 3¼ | 160 F | 140 F | 140 P | 160 F | 140 F | — | — | — | — | — | 140 |
| A | C | 3¼ | 3¼ | 200 P | 230 (F) | 230 P | 230 P | — | — | — | — | — | — | 230 |
| A | C + SAB | 3¼ | 4 | 250 (F*) | 250 P | 280 P | 310 P | 340 F | 310 P | 340 F | 320 F | 310 P | 320 F | 315 |
| A | C + 2SAB | 3¼ | 4 | 340 F | 340 P | 360 F | 340 P | 340 (F*) | 340 F | — | — | — | — | 325 |
| A | S | Doboy band sealer | | 210 P | 240 F | 210 F | 180 F | 150 (F) | 150 F | 120 P | 150 F | — | — | 140 |
| A | C | 8 m/min 220° C. | | 180 P | 210 P | 240 (F) | 240 P | 270 F | 250 P | 270 P | 290 P | — | — | 270 |
| B | S | Impulse: 3 | 3 | 160 F | 160 P | 180 F | 160 F | 160 F | 140 P | 140 P | 150 F | — | — | 150 |
| B | S | 2¾ | 1¼ | 140 F | 140 F | 120 F | 100 F | 80 F | — | — | — | — | — | 80 |
| B | C | 2¾ | 1¼ | 100 P | 120 P | 150 P | 180 P | 210 P | 240 P | 300 F | 270 F | 240 F | 230 P | 240 |
| B | C | 2¾ | 2¼ | 150 P | 180 P | 210 P | 240 P | 300 P | 330 F | 300 F | 270 F | 240 F | 240 P | 250 |
| B | C + SAB | 3¾ | 2¼ | 230 P | 260 P | 290 P | 320 P | 350 P | 380 P | 380 F | 350 P | 380 F | 360 P | 370 |
| B | S | 2¾ | 2¼ | 180 F | 150 F | 120 F | 100 P | 120 F | 120 F | 100 F | 80 F | 80 F | — | 90 |
| B | C | 2¾ | 2¼ | 300 P | 330 F | 330 F | 300 F | 270 F | 240 F | 210 (F) | 210 P | 240 F | 240 F | 230 |
| B | C + SAB | 2¾ | 2¼ | 230 P | 260 F | 250 P | 260 P | 290 P | 320 F | 290 P | 320 F | 300 F | | 300 |

EXAMPLE 3

The objective of this example is to investigate the improvements in drop-performance of gussetted bags by use of the "Gussett Embossment" alone and in combination with the S-A-B. The material for the bags investigated was the "R₁" cross-laminate also used in example 2, except that the LLDPE of example 2 has been the octene copolymer of ethylene, but in this example was its copolymer with butene. The guage of the cross-laminate now was 80 gam. Tubing was carried our as in example 1, the tube width being 56 cm before gussetting. A 50 mm deep gusset was folded by hand, and heat-sealed bags made by use of impulse sealing. The conditions for sealing were optimized and no cooling period applied. The sealing conditions were the same for all bags tested.

The Gusset Embossment was carried out on the tube before gussetting, while the S-A-B pattern was embossed into the laminate after gussetting.

For both types of embossment, the same embossment wheels, and the same pattern was used as in examples 1 and 2, with the modification that the wheels now were tightly screwed towards each other to increase the stretch ratio. A depth of embossment was measured corresponding to stretch ratio about 1.30:1. The heat-seal was made about 20 cm from the start of the Gusset Embossment, and the S-A-B, which comprised gusset as well as outer faces of the bag, was embossed immediately adjacent to the Gusset Embossment on the side of the latter which was opposite to the heat-seal.

It should be born in mind (see example 1) that the width of "unaltered ribbons" were 1.0 mm, width of rows of indentations 10 mm, and width of the S-A-B (now also of the Gusset Embossment) 50 mm.

The bags were filled with 50 kg salt (sodium chloride). At the top, the gusset was straightened out to give the bag its full width 56 cm, and the bag was closed with a reinforced self adhesive tape. Free space over the level of contents was 10 cm.

The following test-cycle was applied: (1) flat drop one side, (2) flat drop on the other side, (3) drop on one edge, (4) drop on the other edge. It was considered needless to carry out bottom and top-drops, since the latter would not cause or further develop ruptures.

The first bag tested was without any embossment, neither Gusset Embossment nor S-A-B. It was dropped flat from 90 cm height and the first drop produced a split about 10 cm long at each of the two critical locations (see (7) is FIG. 6). The drop cycle was interrupted after this first drop.

A second bag tested was with out Gusset Embossment and S-A-B, and was tried in the above mentioned cycle of four drops from 400 cm. After the two flat drops there was observed very small tears at the two critical locations, and after the subsequent two edge-drops the length of tearing was measured to be 10 mm and 12 mm.

A third bag, also with both Gusset Embossment and S-A-B was tested in the same cycle of four drops, but from 300 cm. There occured no tearing at all.

It is therefore judged that the Gusset Embossment and S-A-B together has improved the performance of the bag by a factor higher than four.

A fourth bag was produced with the Gusset Embossment, but without S-A-B and was tested in one single flat drop from 400 cm. There was observed a 5 mm tear at one and a 8 mm tear at the other critical location which in any case is less than the damage of bag no. 1 tested from 90 cm only and also on one flat drop only.

As an interesting further feature of the bags with Gusset Embossment, it was observed that the filled bag exhibited clearly better block shape at the bottom than the gussetted sacks with the Gusset Embossment.

EXAMPLE 4

The objective of this example is to demonstrate the improvements which the S-A-B causes in a bag with sewn top and/or bottom seam.

The bags were made from the biaxially oriented cross-laminate, which which is designated as "R$_2$" in example 3 of U.S. Pat. No. 4,629,525. This is stiffer than "R$_1$" used in examples 2 and 3, and connected with this higher stiffness exhibits a higher tear propagation resistance. For further improvements of stitching strength, the spiral cutting angle 45° used in the mentioned example of the U.S. patent, was substituted by spiral cutting angle 30°. The stretching and lamination of the plies were carried out by the improved method described in example 3 of my copending PCT application PCT/GB88/00027. The stretch ratios were 1.40:1 in both directions, and guage 70 gsm.

Tubing was carried out as in example 1, to give bag width 56 cm. The side seam was positioned 6–7 cm from the edge, which was the closest that could be made continuously on the tubes actually used. The bottom of the bag sewn, while using over-folding of the bag material in the seam and over-taping with crepe paper. The distance between the stitches was 8 mm.

The S-A-B was embossed in the pattern and by the apparatus described in example 1, except that the pattern was modified so that "ribbon" width equaled "indentation" length, but still giving the same total, namely 11 mm (the division of the S-A-B), and the S-A-B was still 50 mm wide. This change of embossment pattern was made, not particularly because sewing should be applied, but because the other pattern, which was developed for a polypropylene composition, was considered less suitable for the polyethylene composition.

Strain/stress diagrams taken in the S-A-B are shown in FIG. 4B and similar diagrams from the unembossed cross-laminate in FIG. 4B. Comparison between these diagrams and explanation of the significance are given in the description of these figures. As mentioned here, it appears from FIG. 4A that the stretch ratio in the tows of indentations has been 1.28:1, a value which also with approximation is estimated from the observed shape and measured dimensions of the indentations.

The bags were filled with 20 kg polyethylene granules and closed by overtaping with reinforced seld adhesive tape. The free space between the top level and the closure, measured as indicated in example 1, was 11–12 cm.

Four bags with, and four without, S-A-B were drop-tested around the values which beforehand were judged to be their critical drop heights. There was used the same drop-test cycle as in example 3. By these trials, the bags without S-A-B were estimated to have critical drop height 120 cm and the bags with S-A-B 250 cm.

If bags are under a particularly high pressure in a stack, the S-A-B can conceivably become stretched so much that the embossment disappears, but the latter will be to some extend revert when the pressure has been released. Further, the stretching caused by the pressure will have oriented the disoriented weak line adjacent to the heat-seal (in the case of heat-sealed bags) so that the seam in any case is reinforced. With properly selected dimensions for the S-A-B, the deformation when the embossment disappears, will not be serious for the quality of stacking. Thus, in all of the examples, full force to eliminate the embossment will cause only 20–30% elongation of a 5 cm wide S-A-B, or with one S-A-B at top and one at bottom, a total elongation of about or less than 3 cm. Since normal length for a 50 kg bag is about 1.0 m or slightly less, the total elongation of the bag caused by full stretching-out of the two S-A-B's will be about 3–4% at the highest, all provided the need for S-A-B effect does not exceed the improvements which have been demonstrated by these examples.

I claim:

1. A tube for forming a tubular bag closed at at least one end by a generally transverse seam at a predetermined generally transverse locus along the length of the tube, said seam resulting in a rupture zone adjacent thereto which is susceptible to rupture when subjected to impact stress, said tube being formed of generally continuous orientable thermoplastic polymeric material, the film material of said tube including adjacent the predetermined locus of said rupture zone a shock-absorbing band of limited depth perpendicular to said predetermined locus which is separated from said locus by a region of unstretched film material and extends in width over a significant portion of the transverse dimension of the tube, said shock absorbing band comprising:

a plurality of discrete stretched zones of film material stretched in a direction generally perpendicular to the locus and alternating one by one with a plurality of generally narrow stripes of substantially unstretched film material with the stripes extending lengthwise in substantially the same generally perpendicular direction, whereby impact stress forces applied to the tube material adjacent said rupture zone are transmitted away from said rupture zone and absorbed by said shock absorber band to thereby significantly improve the resistance of the tube to impact stress applied to said rupture zone.

2. The tube of claim 1 wherein said seam is a heat sealed or stitched seam.

3. The tube of claim 2 wherein the stretched zones of said shock absorber band are formed as stripes extending lengthwise generally perpendicular to said predetermined generally transverse locus with the film material of said stretched stripes being stretched in said generally perpendicular direction.

4. The tube of claim 3 wherein said unstretched stripes each extend generally perpendicularly of said predetermined generally transverse locus in a substantially straight or zig-zag direction substantially through the band perpendicular to said predetermined generally transverse locus.

5. The tube of claim 1 wherein the dimension of said shock absorber band perpendicular to said predetermined generally transverse locus is in the range of about 3–10 cm.

6. The (bag or) tube of claim 1 having generally opposed front and rear faces joined along side edges and wherein said shock absorber band terminates at its lateral ends inwardly of the side edges of said bag.

7. The tube of claim 1 having generally opposed front and rear faces joined along side edges and wherein said shock absorber band is present on each of (the) such faces (thereof) adjacent each (of the) such locus.

8. The tube of claim 1 wherein each unstretched stripe has a transverse dimension parallel to said locus which is equal to about 5–150% of the corresponding dimension of each of the stretched zones.

9. The tube of claim 1 wherein the film material in each such stretched zone is stretched into a plurality of embossments by engagement between a plurality of intermeshing embossing teeth, said teeth being interrupted at spaced points to form the unstretched stripes.

10. The bag or tube of claim 9 wherein said embossments are oblong in shape with their greater dimension extending parallel to the end seam.

11. A tube for bag-making formed of a sheet of continuous orientable thermoplastic polymeric film material, said sheet having two opposite side edges which are seamed together to form a longitudinal seam and having adjacent said longitudinal seam a rupture zone susceptible to undergoing rupture when subjected to impact stress, the film material of said tube including adjacent each said rupture zone a shock-absorbing band which is separated from said longitudinal seam by a region of unstretched film material and extends along a significant portion of the seam length, said shock absorbing band comprising:
- a plurality of discrete stretched zones of film material stretched in a direction generally perpendicular to the seam alternating one by one with a plurality of stripes of substantially unstretched film material with the length of said stripes extending in a direction generally perpendicular to the seam,
- whereby when the rupture zones are subjected to impact stress, the stress forces are transmitted away from said rupture zone and absorbed by said shock absorber band to thereby significantly improve the the resistance of the rupture zones to such stress.

12. A tubular gusseted bag having at least one generally transverse seam defining an end thereof, being formed of generally continuous orientable thermoplastic polymeric film material, said bag comprising opposed generally rectangular front and back panels of film material united along side edges of such panels and having corresponding side margins of respective ones of said panels adjacent said side edges each tucked inwardly along a central fold line and held in such tucked position by said seam to create a gusset to give a generally rectangular shape in transverse cross-section to the bag when expanded, the gussetted bag being susceptible to rupture under impact stress at a junction of each said fold line and said seam, the tubular bag therefor being provided on the tucked side margins of each said gusset adjacent to each said rupture junction with a localized stress-relieving zone, each said stress-relieving zone comprising:
- at least one elongated zone of stretched film material formed by stretching the film material in a direction generally perpendicular to the end seam along at least one line intersecting the center fold line of at at least one of said gussets and extending on either side of the center fold line into the tucked side margins of the gusset,
- whereby impact stress applied to said at least one gusset is prevented from being concentrated at the rupture junctions by said stress-relieving zones to thereby significantly improve resistance of such rupture junctions to rupture under such stress.

13. The gussetted bag of claim 12 wherein there are a plurality of said elongated zones of stretched film material in spaced parallel relation which together have a generally undulating configuration in cross-section taken longitudinally through such zones parallel to the central fold line.

14. The gussetted bag of claim 12 wherein each such elongated zone of stretched material is interrupted along its length by a plurality of ribbons of unstretched material.

15. In a bag formed from continuous orientable polymeric film material and having at least one generally transverse seam defining an end of the bag which seam is susceptible to rupture when stressed, the improvement comprising a pattern of discrete localized embossed indentations in the film material defining a generally band-shaped zone extending generally parallel to said seam in a location adjacent to but separated from the seam, the film material of said embossed indentations being stretched mainly in a direction perpendicular to the length of the seam, said indentations being arranged in a plurality of rows generally perpendicular to the seam length which are separated by ribbons of unstretched film material, whereby the resistance of the seam to rupture under stress is significantly increased.

16. A tube formed of generally continuous orientable thermoplastic polymeric film material for forming a tubular gusseted bag closed at at least one end thereof by a generally transverse seam, each such seam being located at a predetermined generally transverse locus along the length of the tube, said gussetted bag comprising opposed generally rectangular front and back panels of film material united along side edges of such panels and having corresponding side margins of respective ones of said panels adjacent said side edges each tucked inwardly along a central fold line and held in such tucked position by said seam to create a gusset to give a generally rectangular shape in transverse cross-section to the bag when expanded, the gussetted gussetted bag being susceptible to rupture under impact stress at a junction of each said fold line and said seam, the improvement wherein the film material of the tube for said gussetted bag is provided at a locus which corresponds to the tucked side margins of each said gusset of the gussetted bag and is adjacent to each of the rupture junctions with a localized stress-relieving zone, each said stress-relieving zone comprising:
- at least one elongated zone of stretched film material formed by stretching the film material in said zone in a direction generally perpendicular to the predetermined generally transverse locus of the end seam along at least one line which intersects the center fold line of of at least one of said gussets of the gussetted bag and extends on either side of such center fold line generally parallel to said predetermined locus of said end seam,
- whereby impact stress applied to the gussets of the gussetted bag is prevented from being concentrated at the rupture junctions by said stress-relieving zones to thereby significantly improve the resistance of such rupture junctions to rupture under such stress.

17. The tube of claim 16 wherein the film material in each elongated zone of stretched film material constituting one of said stress-relieving zones is formed as a plurality of spaced apart stripes extending lengthwise generally perpendicular to said predetermined generally transverse locus of the end seam with the film material of said stretched stripes being stretched in said direction generally perpendicular to said predetermined locus of the end seam.

18. The tube of claim 17 wherein the stripes of stretched film material are separated by stripes of unstretched film material each extending in a direction generally perpendicularly of said predetermined generally transverse locus in a substantially straight or zig-zag direction substantially through each said stress-relieving zone perpendicular to said predetermined generally transverse locus.

19. The tube of claim 18 wherein said stress-relieving zone is constituted of a plurality of said elongated zones of stretched film material in spaced relation parallel to said predetermined generally transverse locus which together have a generally undulating configuration in cross-section taken longitudinally through such zones parallel to the central fold line.

20. A tubular bag closed at at least one end by a generally transverse seam, said seam resulting in at least one rupture zone adjacent thereto which is susceptible to rupture when subjected to impact stress, said bag being formed of generally continuous orientable thermoplastic polymeric material, the film material of said bag including adjacent each such rupture zone a shock-absorbing band of limited depth perpendicular to said seam which is separated from said seam by a region of unstretched film material and extends generally parallel to said seam over a significant portion of the seam length, said shock absorbing band comprising:

a plurality of discrete stretched zones of film material stretched in a direction generally perpendicular to the seam alternating one by one with a plurality of generally narrow stripes of substantially unstretched film material with the stripes extending lengthwise in substantially the same generally perpendicular direction, whereby impact stress forces applied to the bag material adjacent said rupture zone are transmitted away from said rupture zone and absorbed by said shock absorber band to thereby significantly improve the resistance of the bag to impact stress applied to said rupture zone.

21. The bag of claim 20 wherein each said shock absorber band extends in depth from a position separated from said end seam by at least one cm to a position not more than 25% of the length of the bag perpendicular to said seam.

22. A tubular bag having a generally transverse seam at one end and and a generally longitudinal seam along at least one side thereof, said bag being formed of continuous orientable thermoplastic polymeric film material, said bag having adjacent said longitudinal seam a rupture zone susceptible to undergoing rupture when subjected to impact stress, the film material of said tube including adjacent said rupture zone a shock-absorbing band which is separated from said longitudinal seam by a region of unstretched film material and extends generally parallel to said longitudinal seam over a significant portion of the length of said longitudinal seam, said shock abosorbing band comprising:

a plurality of discrete stretched zones of film material stretched in a direction generally perpendicular to the longitudinal seam alternating one by one with a plurality of stripes of substantially unstretched film material with the length of said stripes extending in a direction generally perpendicular to said longitudinal seam, whereby impact stress forces applied to said rupture zone are transmitted away from said rupture zone and absorbed by said shock absorber band to thereby significantly improve the resistance of the rupture zone to such stress.

23. A method of manufacturing from generally continuous orientable polymeric film material a bag having a generally transverse seam at a predetermined location defining at least one end of the bag, which comprises before or after the seam is made, embossing the film material along a generally band-shaped zone adjacent to but separated from the location of the seam with a pattern of discrete localized indentations in which the film material is stretched mainly in a direction perpendicular to the length of the seam, said indentations being arranged in a plurality of rows generally perpendicular to the seam length which are separated by ribbons of unstretched film material.

24. The method of claim 23 wherein said indentations have a generally undulating configuration when viewed in cross-section through one of said rows thereof.

25. The method of claim 24 wherein said indentations are elongated generally parallel to the length of the seam.

26. In a method of manufacturing from generally continuous orientable thermoplastic polymeric film material a gussetted bag having opposed front and back faces, each such face having opposite side edges with the corresponding side edges of the faces being united and having opposite side margins adjacent such side edges, the corresponding side margins of the respective faces being tucked inwardly along a central fold line to form a gusset, said bag having across at least one end thereof a generally transverse seam which extends across the inwardly tucked side margins of the gusset to secure such inwardly tucked side margins in their inwardly tucked condition, the end seam intersecting with each central fold line to define at such intersection a point of susceptibility to rupture under impact stress, the improvement which comprises the step of embossing selective regions of said inwardly tucked side margins generally adjacent to each rupture point along at least one line which intersects the corresponding central fold line in generally perpendicular relation and extends into the tucked side margins on either side of such central fold line to form in the gusset a transverse zone of stretched film material adjacent each rupture point which zone is capable of relieving impact stress on that rupture point.

27. The method of claim 26 wherein each such embossed zone is interrupted at at least one spaced point along the transverse direction thereof to form generally parallel links of unstretched film material passing through each such zone in a direction generally parallel to said central fold line.

28. The method of claim 26 wherein the side margins of said front and back faces in their inwardly tucked position are overlaid by corresponding side portions of such faces to form a four-ply sandwich of said film material and the resultant four-ply sandwich is subjected to embossing adjacent the end seam to form said transverse zones of stretched film material simultaneously in all four plies of said four-ply sandwich.

29. The method of claim 26 wherein said inwardly tucked side margins are embossed in selective regions thereof generally adjacent to each rupture point along a plurality of lines which intersect said center fold line in generally perpendicular relation and extend into the tucked side margins on either side of said central fold line to form a plurality of spaced parallel transverse zones of stretched film material in the gusset which are capable of relieving impact stress on the rupture point.

* * * * *